Jan. 23, 1940.  W. I. RUSCHE  2,187,952
FENDER GUARD
Filed July 14, 1937
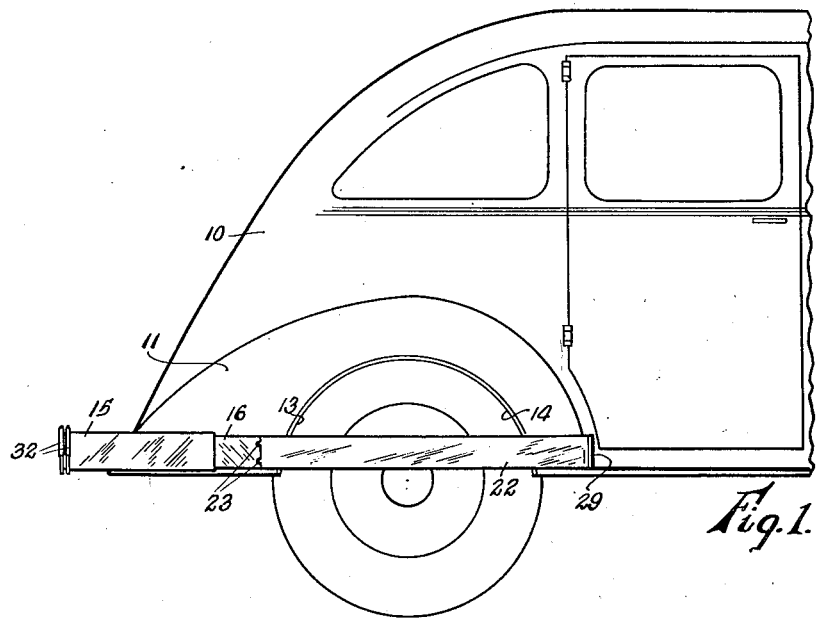
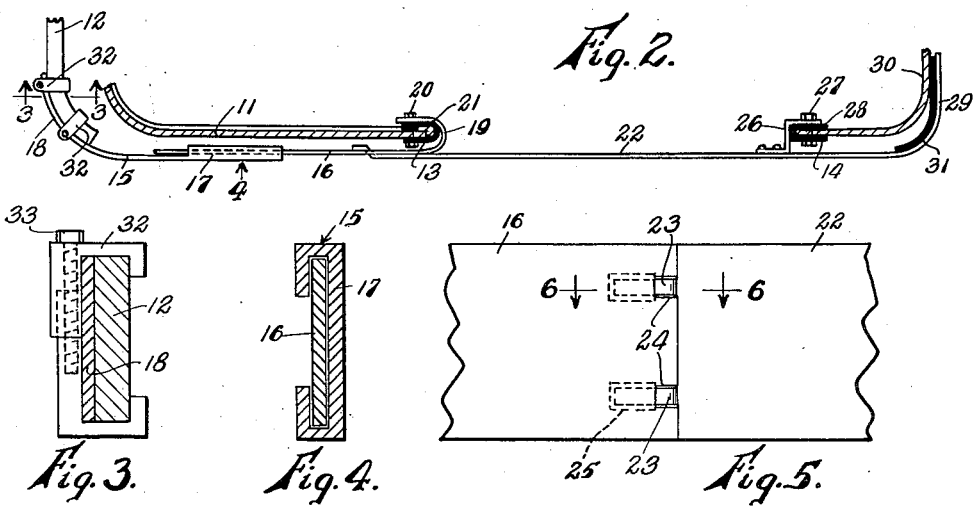
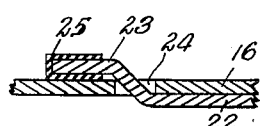
INVENTOR.
William I. Rusche
BY
Murray, Sackhoff, Zugelter & Paddack
ATTORNEYS Patented Jan. 23, 1940

2,187,952

UNITED STATES PATENT OFFICE 2,187,952

FENDER GUARD

William I. Rusche, Cincinnati, Ohio

Application July 14, 1937, Serial No. 153,566

5 Claims. (Cl. 293—57)

This invention relates to a guard for protecting the fenders of vehicles, particularly automobile fenders.

An object of the invention is to provide a guard extending along the outer side of a fender for protecting the latter against collision and deformation by other vehicles and objects.

Another object of this invention is to provide a guard adapted to be attached to the bumper adjacent a fender, the guard being formed of telescopically connected members adapted for longitudinal movement relative to each other so that when the bumper is struck, the force of the blow is not transmitted to the fender, but is taken up by the telescopic movement of the guard members.

Another object of the invention is to provide, in a fender guard of a kind described, a supplementary rail or guard adapted to be attached to the main unit and to extend forwardly thereof so as to protect the front portions of a fender.

Another object is to provide means of the class described adapted for efficiency in manufacture and simplicity in installation.

These and other objects are attained by the means described herein and disclosed in the accompanying drawing, in which:

Fig. 1 is a side elevational view of the rear portion of a motor vehicle of the sedan type, the fender guard of the present invention being shown in operative position thereon.

Fig. 2 is a top edge view of the fender guard means of the present invention and showing the manner of attaching the guard to a fender and bumper, the latter parts of the vehicle being shown fragmentarily.

Fig. 3 is an enlarged cross-sectional view taken on the line 3—3 of Fig. 2.

Fig. 4 is an enlarged cross-sectional view taken on a line indicated by the arrow 4 in Fig. 2.

Fig. 5 is an enlarged side elevational detail view showing the manner of connecting the supplementary guard of the present invention to the main unit of the fender guard.

Fig. 6 is an enlarged cross-sectional view taken on line 6—6 of Fig. 5.

With reference to the drawing:

Fig. 1 shows the rear portions of an automobile 10 provided with a fender 11 and with a bumper 12 seen in Fig. 2. The fender illustrated is of the well known type which provides a pair of opposite substantially upright edge portions 13 and 14 intermediate the ends of the fender at one side thereof. It is obvious that these edges result from the commonly seen arcuate cut-out on fenders as they are usually made today.

The fender guard means of the present invention comprise a pair of rail members 15 and 16 which, as seen in Fig. 2, are attached together for longitudinal movement relative to one another. For this purpose, the rail member 15 may be formed, for a distance adjacent one end, to provide a sleeve 17 slidably receiving the other rail member 16.

The two rail members 15 and 16 are adapted to be positioned to extend along the outer side of a fender, adjacent the rear portion of the latter. The rail member 15 is therefore formed, as at 18, (Fig. 2) to lie against or be suitably associated with the end portion of the bumper 12 adjacent the fender. This may be accomplished, as illustrated in Fig. 3, by the use of suitable clamps 32 which may be of the telescopic type through the cooperating parts of which a threaded bolt 33 may be projected in a manner well known. As shown in Fig. 2, two of the clamps 32 are provided for holding the associated end of the rail member 15 in position.

The outer end portion of the other rail member 16 may be formed with a loop or hook 19 adapted to embrace the intermediate edge portion 13 of the fender. This portion of the fender as well as the end of the hook 19 may be provided with perforations for receiving suitable nut and bolt means 20 for attaching the member 16 to the fender. It will be seen in Fig. 2 that an insulation member 21 of rubber or composition may embrace the edge portion 13 of the fender, within the hook 19, and be attached to said edge portion by the bolt means 20. The rail unit thus far described is adapted to protect a fender in those portions thereof where distorting impacts are most frequently received. Inasmuch as the rail unit is constructed so as to be relatively non-yielding transversely thereof, the rail unit is adapted to receive and ward off from the fender laterally directed impacts in that direction. In addition, endwise impacts directed against the bumper 12 are compensated for by the longitudinal movement relative to one another for which the rail members 15 and 16 are constructed.

The present invention likewise contemplates a supplementary guard 22. This may consist of an elongated rail member extending forwardly from the rail unit already described and adapted to embrace the front portions of the fender so as to protect the latter. The rail member 22 may be formed at one end with a pair of integral tongues 23 adapted to be inserted in apertures 24 provided adjacent the attached end of the rail member 16. These tongues, as indicated in Fig. 6, may be offset or bent inwardly so that the rail member 22 is permitted to lie in substantially flat relation with the outer face of the rail member 16. The extreme ends of the tongues 23 may have insulating sleeves 25 attached thereto for serving the double purpose of firmly positioning the tongues and preventing wearing abrasion and rattling at these points.

Adjacent the opposite end of the rail member 22, the inner face of the latter may have secured thereto a bracket 26 which is adapted to embrace the edge portion 14 of the fender 11 and to be attached thereto by bolt means 27 similar to those already described. Insulation 28 may be associated with the parts just described. In this manner the rail member 22 is held in position. The extreme end portions of said rail members are preferably bent inwardly, as indicated at 29, Fig. 2, so as to embrace the similarly bent portion 30 of the fender. Insulation 31 may be positioned between these parts.

It is obvious that the fender guard herein disclosed is simple in construction and adapted to be easily attached to and removed from a fender. In Fig. 2 it will be seen that there is sufficient clearance between the guard and the adjacent portions of the fender to provide for cleaning the latter without removal of the fender guard.

Finally, the means of the present invention may be utilized either on rear fenders, as herein disclosed, or upon the front fenders of the car, in which latter case, the main or telescopic rail unit would be attached to the fore portion of the front fender and the supplementary rail member attached to the rear portion of said fender, the construction and attachment of these parts being substantially the same as already described.

What is claimed is:

1. A guard for fenders on vehicles provided with bumpers, the guard comprising a pair of rail members disposed in lengthwise alignment and attached together for longitudinal movement relative to one another, and means for attaching one of said members to a lateral portion of a fender and the other of said members to the adjacent bumper, the positioned rail unit being adapted to extend along the outer side of the fender for receiving lateral impacts in the direction of the protected fender, and the rail unit being further adapted to yield longitudinally thereof upon impact directed against the associated bumper.

2. A fender guard for vehicles provided with bumpers and with fenders formed to provide an intermediate substantially upright edge portion on the outer side of the fender, said guard comprising a pair of rail members attached together for longitudinal movement relative to one another, and means for attaching an end of one of said members to said intermediate edge portion of a fender, and an end of the other rail member to the adjacent bumper, whereby the rail members may be positioned to extend along the outer side of the fender for receiving lateral impacts in the direction of the fender and for yielding to endwise impacts directed against the bumper.

3. A fender guard for vehicles provided with bumpers and with fenders formed to provide intermediate substantially upright edge portions on the outer side thereof, said guard comprising a pair of rail members attached together for longitudinal movement relative to one another, means for attaching an end of one of said members to one of said intermediate edge portions of the fender and an end of the other rail member to the adjacent bumper, whereby the rail members may be positioned to extend along the outer side of the fender, a supplementary rail attachable to said fender-connected rail and adapted to extend forwardly thereof along the fore portion of the fender, and means for attaching the supplementary rail to another of said intermediate edge portions of the fender.

4. A guard for fenders on vehicles provided with bumpers, the guard comprising a rail unit adapted to extend along the outer side of one portion of a fender and comprising members yieldable relative to one another, means for attaching said unit to the bumper adjacent the fender and to the lateral portions of the vehicle, a supplementary rail adapted to extend along another portion of the fender, and means for attaching the supplementary rail to said first rail unit and to the adjacent portion of the vehicle.

5. A guard for fenders of the kind used on automobiles and the like and comprising two strip-like members, one of said members being secured by one end to the body portion of the fender and projecting laterally of the fender toward an extremity thereof and in spaced relation therewith, the other of said members being secured by one end independently of the fender and extending toward said other member in lengthwise alignment therewith and in spaced relation with the fender, the unsecured ends of said two members being connected together for longitudinal movement relative to one another to provide for yielding upon impact directed against said members.

WILLIAM I. RUSCHE.